(12) United States Patent
Saito

(10) Patent No.: US 9,420,162 B2
(45) Date of Patent: Aug. 16, 2016

(54) IMAGE CAPTURING APPARATUS AND CONTROL METHOD THEREOF

(71) Applicant: CANON KABUSHIKI KAISHA, Tokyo (JP)

(72) Inventor: Junichi Saito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/581,448

(22) Filed: Dec. 23, 2014

(65) Prior Publication Data

US 2015/0189157 A1    Jul. 2, 2015

(30) Foreign Application Priority Data

Dec. 27, 2013  (JP) ................................. 2013-273174
Oct. 29, 2014  (JP) ................................. 2014-220627

(51) Int. Cl.
  *H04N 5/345*   (2011.01)
  *H04N 5/232*   (2006.01)
  *H04N 5/378*   (2011.01)

(52) U.S. Cl.
  CPC ....... *H04N 5/23212* (2013.01); *H04N 5/23229* (2013.01); *H04N 5/3454* (2013.01); *H04N 5/378* (2013.01)

(58) Field of Classification Search
  CPC .......................... H04N 5/378; H04N 5/23212

USPC ......................................................... 348/353
See application file for complete search history.

(56) References Cited

U.S. PATENT DOCUMENTS

2010/0189175 A1*  7/2010  Fujii ................... H04N 19/126
                                                         375/240.03
2011/0267533 A1*  11/2011  Hirose ............... H04N 5/23212
                                                         348/345

FOREIGN PATENT DOCUMENTS

JP    2004-317699 A    11/2004
JP    2008-139683 A    6/2008

* cited by examiner

*Primary Examiner* — Twyler Haskins
*Assistant Examiner* — Fayez Bhuiyan
(74) *Attorney, Agent, or Firm* — Cowan, Liebowitz & Latman, P.C.

(57) ABSTRACT

An image capturing apparatus comprises an image sensor configured to receive object image light and sequentially read out image signals in a horizontal or vertical direction, a detection unit configured to detect an object region, a focus adjustment unit configured to perform focus adjustment; a storage unit configured to perform thinning processing and to sequentially store the image signals that have undergone thinning, and a calculation unit configured to filter the stored image signals, and calculate a focusing signal of a different direction from a readout direction, the storage unit increases a thinning rate of image signals in the readout direction to be greater when the object region is a second size than when the object region is a first size, the second size being larger than the first size.

24 Claims, 8 Drawing Sheets

IMAGE CAPTURING APPARATUS AND CONTROL METHOD THEREOF

BACKGROUND OF THE INVENTION

1. Field of the Invention

The present invention relates to an automatic focusing control using a contrast of an object.

2. Description of the Related Art

Image capturing apparatuses such as digital still cameras and digital video cameras widely use a contrast AF system for performing automatic focusing based on contrast evaluation values that are obtained by bandpass filtering image signals horizontally read out from an image sensor. In recent years, techniques that calculate a vertical contrast evaluation value in addition to a horizontal contrast evaluation value and perform automatic focusing based on both the horizontal and vertical contrast evaluation values have also appeared. Meanwhile, advances in face detection and face recognition techniques has resulted in the wide application of techniques that identify a person's face region from a captured image and perform automatic focusing using the face as a focus measuring frame.

For example, Japanese Patent Laid-Open No. 2008-139683 describes a technique that computes both horizontal and vertical contrast evaluation values with respect to a focus measuring frame set on the face region and weights the vertical contrast evaluation value. Also, Japanese Patent Laid-Open No. 2004-317699 describes a technique that sets a frame only on the eye region in the case where a face that is larger than a predetermined size is detected.

However, with Japanese Patent Laid-Open No. 2008-139683, a considerable amount of line memory needs to be secured for acquiring vertical contrast components in the case where the size of the detected face is large, since a focus measuring frame that matches the size of the face needs to be provided. Also, with Japanese Patent Laid-Open No. 2004-317699, the fact that only the component of the eye region is extracted out of the vertical contrast components included in the face leads to concern about deterioration of the S/N ratio when focus adjustment is performed, due to not being able to effectively utilize the biological characteristic of there being lots of contrast components in the vertical direction of the face.

SUMMARY OF THE INVENTION

The present invention has been made in consideration of the aforementioned problems, and realizes a technique that, in contrast evaluation performed in a different direction from the readout direction, enables the contrast components of a detected object region to be acquired in the different direction from the readout direction, even when an amount of line memory corresponding to the size of the object region is not secured.

In order to solve the aforementioned problems, the present invention provides an image capturing apparatus comprising: an image sensor that has pixels arranged in a two-dimensional array, and is configured to receive object image light and sequentially read out image signals in a horizontal direction or a vertical direction; a detection unit configured to detect an object region based on image signals captured by the image sensor; a focus adjustment unit configured to perform focus adjustment based on image signals within the detected object region; a storage unit configured to perform thinning processing on at least a portion of the image signals that are included in the object region in the direction in which the image signals are read out from the image sensor, and to sequentially store the image signals that have undergone thinning; and a first calculation unit configured to filter the image signals stored by the storage unit sequentially in a different direction from the readout direction, and calculate a focusing signal of the different direction from the readout direction, wherein the storage unit increases a thinning rate of image signals in the readout direction to be greater when the object region is a second size than when the object region is a first size, the second size being larger than the first size.

In order to solve the aforementioned problems, the present invention provides a control method of an image capturing apparatus having an image sensor that has pixels arranged in a two-dimensional array and is configured to receive object image light and sequentially read out image signals in a horizontal direction or a vertical direction, the method comprising the steps of: detecting an object region based on image signals captured by the image sensor; performing thinning processing on at least a portion of the image signals that are included in the object region in a direction in which the image signals are read out from the image sensor, and sequentially storing the image signals that have undergone thinning; and filtering the stored image signals sequentially in a different direction from the readout direction, and calculating a focusing signal of the different direction from the readout direction, wherein, in the storing step, a thinning rate of image signals in the readout direction is increased to be greater when the object region is a second size than when the object region is a first size, the second size being larger than the first size.

According to the present invention, it becomes possible, in contrast evaluation performed in a different direction from the readout direction, to acquire the contrast components of a detected object region in the different direction from the readout direction, even when an amount of line memory corresponding to the size of the object region is not secured.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Although an example in which an image capturing apparatus of the present invention is realized by a digital camera that captures still images and moving images will be described, the present invention is also applicable to portable electronic devices such as smartphones, tablets and the like that are equipped with a camera function.

Configuration of Focus Adjustment Apparatus

The configuration of a focus adjustment apparatus with which an image capturing apparatus 100 of the present embodiment executes automatic focusing (AF) control will be described, with reference to FIG. 1A.

Figure 1A:
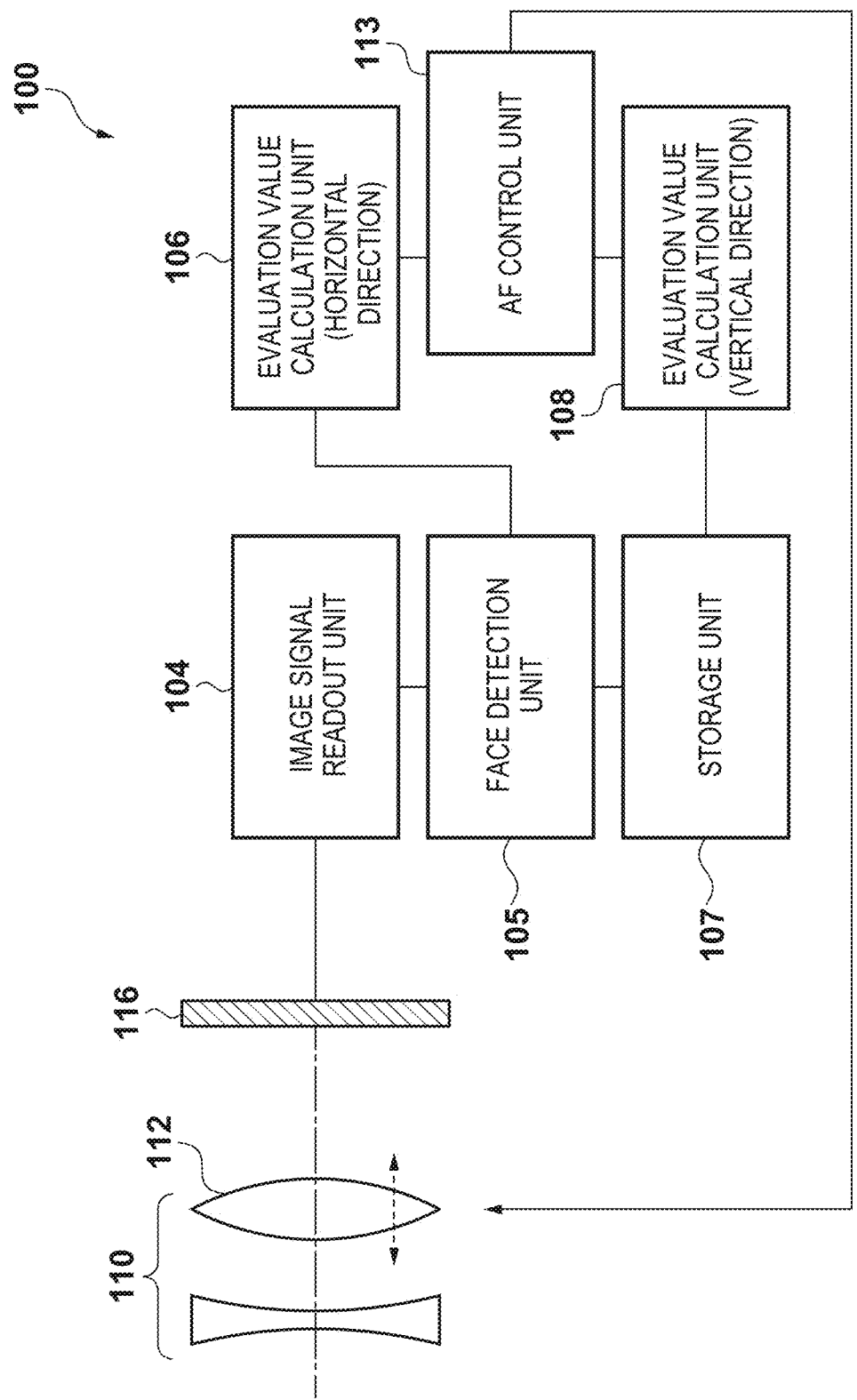
FIGS. 1A and 1B are block diagrams showing an apparatus configuration according to the first embodiment.

In FIG. 1A, a photographing lens 110 includes a focus lens 112 as a focus adjustment optical system, and object image light, which is reflected light from the object, is imaged on a light receiving surface of an image sensor 116 by the photographing lens 110.

The image sensor 116 has pixels in which photoelectric conversion elements are arranged in a two-dimensional array in the horizontal (row) and vertical (column) directions, and photoelectrically converts the object image light imaged by the photographing lens 110. The image signal of each horizontal row photoelectrically converted by the image sensor 116 is transferred and read out vertically by an image signal readout unit 104.

A face detection unit 105 serving as one object detection unit detects the face region of an object (e.g., person) that is included in the image signals read out by the image signal readout unit 104, and sets a focus measuring frame corresponding to the position and size of the detected face.

An evaluation value calculation unit 106 calculates a horizontal contrast evaluation value by filtering the image signals that are included in the focus measuring frame sequentially in the horizontal direction every readout row, extracting a specific spatial frequency component in the horizontal direction, and adding together the specific spatial frequency components of all the rows.

At the same time that the horizontal contrast evaluation value is being calculated by the evaluation value calculation unit 106, a storage unit 107 stores the image signals included in the focus measuring frame to a line memory every readout row by applying a horizontal thinning rate corresponding to the size of the face detected by the face detection unit 105. The storage unit 107 is a memory such as a RAM that provides a work area of the CPU or a ROM that stores programs.

An evaluation value calculation unit 108 filters the image signals stored in the storage unit 107 sequentially in the vertical direction, and calculates a vertical contrast evaluation value.

The storage of image signals in the storage unit 107 and the calculation of the horizontal and vertical contrast evaluation values by the evaluation value calculation units 106 and 108 will be discussed later.

An automatic focusing (AF) control unit 113 drives the focus lens 112 to a focused position based on a focus control value that is set based on both the horizontal and vertical contrast evaluation values calculated by the evaluation value calculation unit 106 and the evaluation value calculation unit 108. Note that because processing such as switching the two (horizontal and vertical) contrast evaluation values and adding weighted evaluation values is well-known technique, description thereof will be omitted here.

Figure 1B:
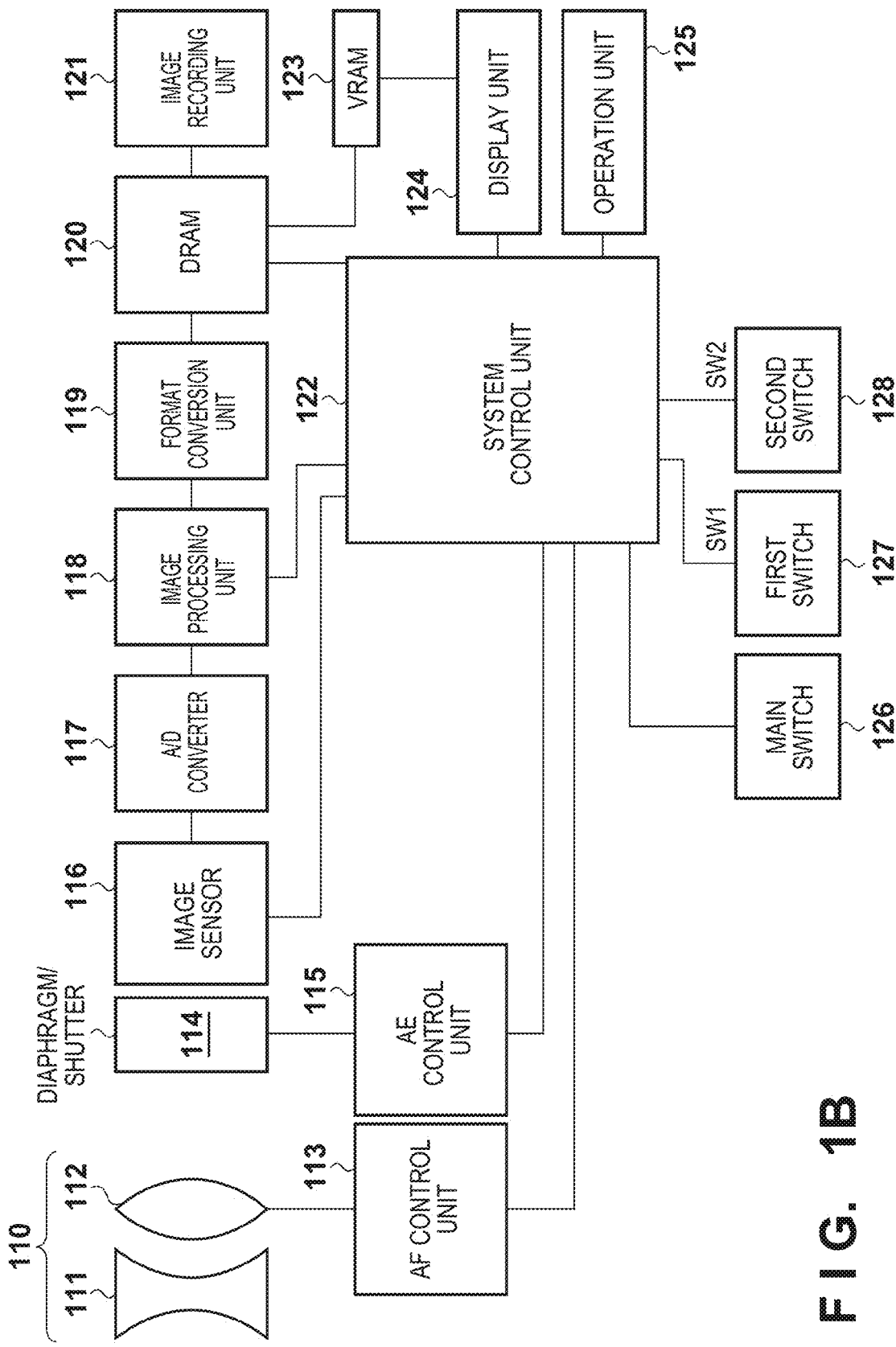

Note that the image signal readout unit 104, the face detection unit 105, the evaluation value calculation units 106 and 108, the storage unit 107 and the AF control unit 113 are realized through the cooperation of hardware and software under the control of a system control unit 122 shown in FIG. 1B.

Configuration of Image Capturing Apparatus

The configuration and functions of the image capturing apparatus 100 of the present embodiment will be described, with reference to FIG. 1B.

In FIG. 1B, the photographing lens 110 includes a zoom lens 111 in addition to the focus lens 112. A diaphragm/shutter 114 adjusts the amount of object image light that is incident on the image sensor 116 and controls the electric charge accumulation period, in accordance with operating commands from an auto exposure (AE) control unit 115. The AE control unit 115 controls the operations of the diaphragm/shutter 114 as well as controlling an A/D converter 117. The focus lens 112 forms an optical image by focusing on the light receiving surface of the image sensor 116, in accordance with control signals from the AF control unit 113.

The image sensor 116 converts the optical image formed on the light receiving surface into electrical signals using the photoelectric conversion elements of a CCD, CMOS or the like, and outputs the electrical signals to the A/D converter 117. The A/D converter 117 converts the analog signals input from the image sensor 116 into digital signals. Also, the A/D converter 117 includes a CDS circuit that removes noise from the analog signals and a nonlinear amplification circuit that nonlinearly amplifies the analog signals before being converted into digital signals.

An image processing unit 118 performs predetermined resizing processing, such as pixel interpolation and image reduction, and color conversion processing on the digital signals output from the A/D converter 117, and outputs image data. A format converter 119 performs format conversion on the image data generated by the image processing unit 118, in order to store the image data in a DRAM 120. The DRAM 120 is one example of a high-speed internal memory, and is used as a high-speed buffer that administers the temporary storage of image data or as a work memory in compression/decompression of image data, or the like.

An image recording unit 121 has a recording medium such as a memory card for recording shot images (still images, moving images), and an interface thereof. The system control unit 122 has a CPU, memories (RAM, ROM), an input-output circuit, a timer circuit and the like, and controls the overall operations of the apparatus as a result of the CPU expanding programs stored on the ROM in the work area of the RAM and executing the programs. Also, the system control unit 122 performs control by selecting a mode to be implemented from among a plurality of electric charge accumulation control modes of the image sensor 116. A VRAM 123 is a memory for use in image display. The display unit 124 is, for example, an LCD or the like, and, in addition to performing image display, display for providing operation assistance and camera status display, displays a shooting screen and a focus measuring region at the time of shooting.

A photographer operates the image capturing apparatus by operating an operation unit 125. The operation unit 125 includes, for example, a menu switch for configuring various settings such as exposure compensation and aperture value settings and settings for when image reproduction is performed, a zoom lever for instructing a zoom operation of the photographing lens, and an operation mode switching switch for switching between shooting mode and reproduction mode. A main switch 126 is for powering on the system. A first switch 127 is for outputting a first switch signal SW1 to the system control unit 122, and performing shooting preparation operations such as AE processing and AF processing. A second switch 128 is for outputting a second switch signal SW2 to the system control unit 122 and giving a shooting instruction, while the first switch signal SW1 output by the first switch 127 is on (shooting preparatory state).

Description of Operations

Figure 2:
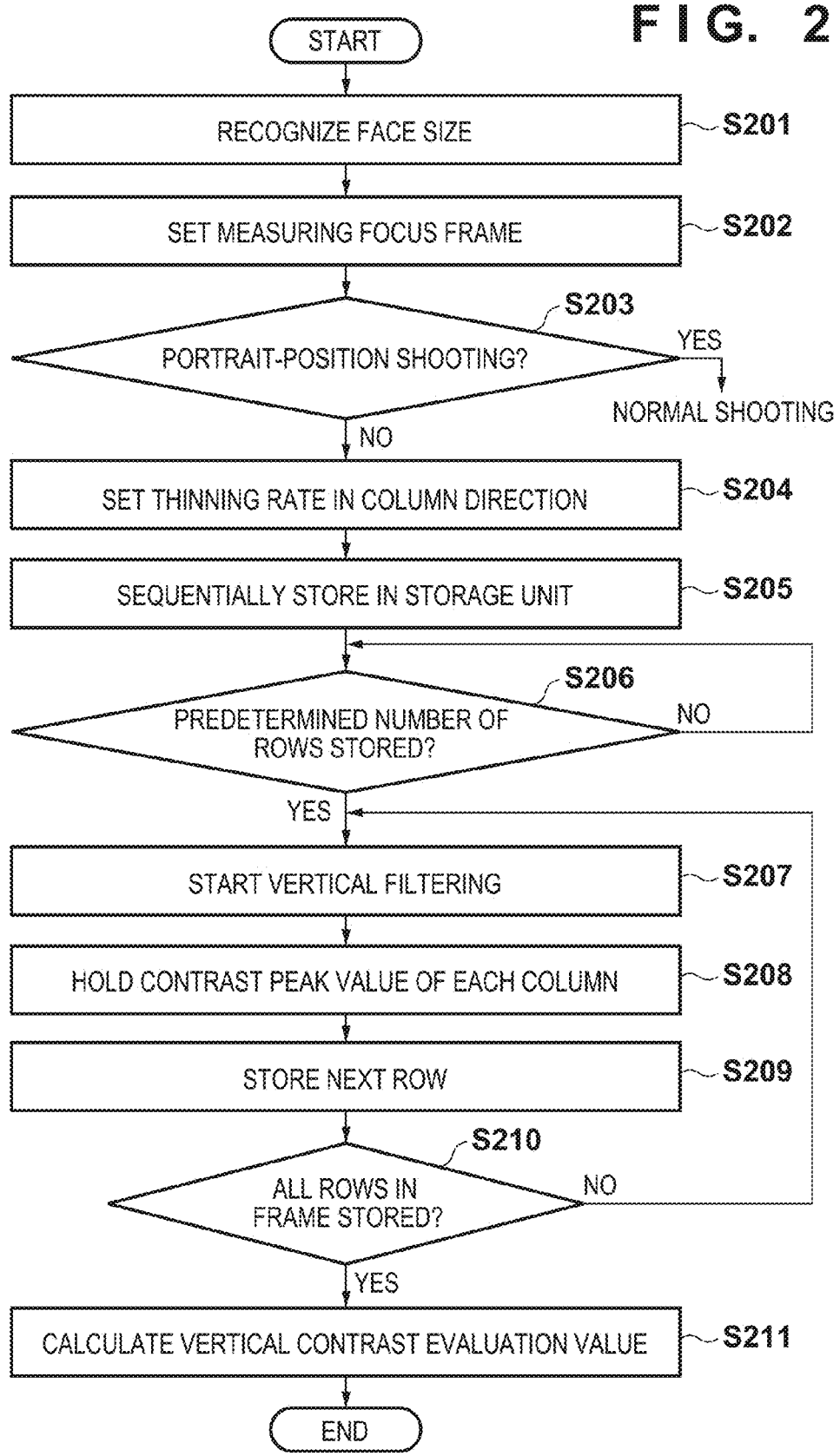
FIG. 2 is a flowchart showing vertical contrast evaluation value calculation processing according to the first embodiment.

FIG. 2 is a flowchart showing vertical contrast evaluation value calculation processing that is performed after image signal readout by the image capturing apparatus 100 of the present embodiment. The processing shown in FIG. 2 is started when the first switch 127 is turned on and the first switch signal SW1 is output to the system control unit 122, and is realized by the system control unit 122 executing a program for performing a focus adjustment operation.

At step S201, the face detection unit 105 detects the face region of a person from the image signals read out by the image signal readout unit 104, and acquires feature information relating to the position and size of the detected face.

At step S202, the system control unit 122 sets a focus measuring frame based on the size of the face detected at step S201.

At step S203, the system control unit 122 determines whether portrait position shooting is to be performed. In portrait position shooting, the biological characteristic of there being lots of high contrast components in the height direction of the face cannot be used due to the height direction of the face substantially coinciding with the horizontal direction of the image sensor 116, and thus there is little merit in performing vertical contrast evaluation. Therefore, if it is determined at step S203 that portrait position shooting is to be performed, normal shooting using only the horizontal contrast evaluation value calculated by the evaluation value calculation unit 106 is performed. If it is determined at step S203 that portrait position shooting is not to be performed, the processing advances to step S204.

At step S204, the system control unit 122 sets the horizontal thinning rate according to the size of the focus measuring frame set at step S202, so as to enable storage in the fixed amount of line memory that is held by the storage unit 107.

At step S205, the storage unit 107 stores the portion that is included in the focus measuring frame, out of the image signal of each horizontal row that is sequentially read out by the image signal readout unit 104, while performing thinning processing in accordance with the horizontal thinning rate set at step S204.

At step S206, the system control unit 122 waits for the image signals of a predetermined number of rows equivalent to the number of taps of the filter that is used in the vertical filtering of step S207 to be stored, after the storage unit 107 has started the thinning and storage in accordance with the horizontal thinning rate. Thereafter, the processing advances to step S207 when storage of the predetermined number of rows is completed.

At step S207, the system control unit 122 starts convolution using the vertical filter. Here, a well-known filtering technique that supports various spatial frequencies is used. Also, filters that extract a plurality of spatial frequency components may be simultaneously used in parallel. Note that the filtering proceeds with the increase in the number of rows that are sequentially stored in the storage unit 107, and rows that have undergone filtering are deleted. Thus, the capacity to store a number of rows equivalent to the number of taps of the filter need only be secured in the storage unit 107.

At step S208, the system control unit 122 sequentially holds a peak value that is calculated from the image signals of each vertical column in the vertical filtering of step S207. The peak value having the highest contrast in the image signals of each vertical column is obtained by repeatedly executing this processing (steps S209 and S210).

At step S211, the system control unit 122 calculates a vertical contrast evaluation value by adding together all the peak contrast values of the columns in the vertical direction obtained up to step S210 using the evaluation value calculation unit 108. The system control unit 122 thus calculates the vertical contrast evaluation value within the focus measuring frame containing the face for one frame and ends the processing.

Note that, at step S203, different thinning rates may be set according to a zoom magnification. In this case, the thinning rate need only be changed to a higher rate at step S204 as the size of the face increases due to zooming.

Although FIG. 2 shows the processing until the vertical contrast evaluation value for one frame is calculated, in practice, a search drive of the focusing lens 112 is then performed by the AF control unit 113, and the vertical contrast evaluation value is calculated for a large number of focus positions in a large number of frames. The focusing lens 112 is then driven with the position of the focusing lens 112 at which the vertical contrast evaluation value obtained at different points is highest as the focused position. This series of operations is referred to as one focus adjustment operation.

Note that the image capturing apparatus 100 of the present embodiment can repeatedly perform this focus adjustment operation from the time of being powered on the main switch 126 and the readout operation by the image signal readout unit 104 being started. Thus, in still image shooting, one focus adjustment operation can be completed more quickly by moving the focusing lens 112 in proximity to the focused position, before the photographer turns on the first switch 127 and gives an instruction to start the focus adjustment operation. Also, in moving image shooting, it is possible to always shoot the object in a focused state by constantly repeating this focus adjustment operation.

When the photographer gives an instruction with the first switch 127 to start the first focus adjustment operation, the horizontal thinning rate that is used by the storage unit 107 is calculated according to the size of the face detected from the first frame, and remains fixed until the focusing lens 112 is moved to the focused position. This is because, in still image shooting, it takes a very short time to complete the focusing after the first switch 127 is turned on, and any change in the size of the face due to movement of the object during this time is minimal.

Horizontal Thinning Processing

Figure 3A:
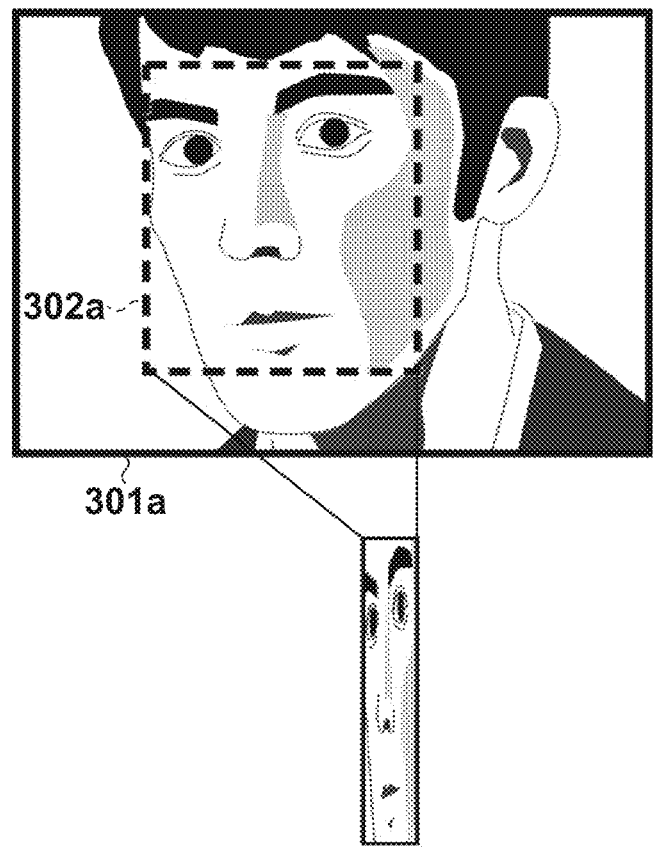
FIGS. 3A and 3B are diagrams illustrating vertical contrast evaluation value calculation processing according to the first embodiment.
Figure 3B:
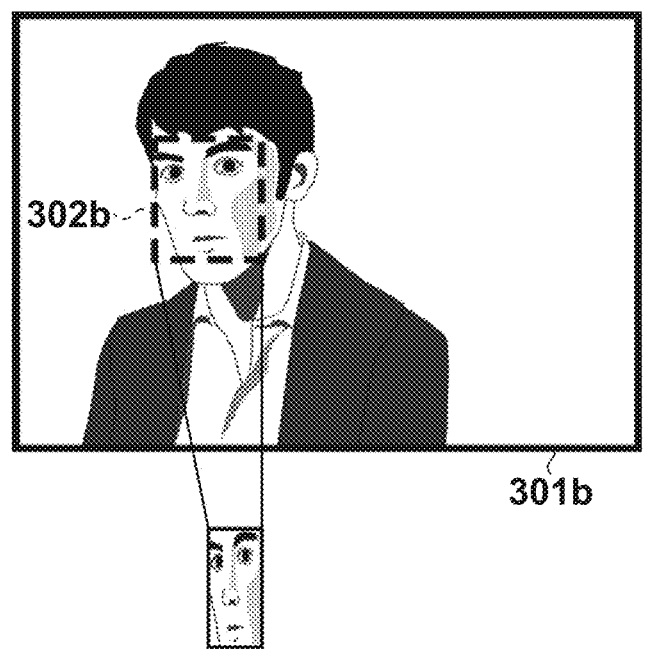

Here, image signals within the focus measuring frame that have undergone thinning processing and been stored in the storage unit 107 at step S205 of FIG. 2 will be described with reference to FIGS. 3A and 3B. FIGS. 3A and 3B illustrates a state in which focus measuring frames 302a and 302b are set on a face region that is included in shot images 301a and 301b, with the size of the face included in the focus measuring frame being different in FIGS. 3A and 3B.

As shown in FIG. 3A, the storage unit 107 sets the horizontal thinning rate to be higher as the size of the face detected by the face detection unit 105 increases (e.g., thinning to $\frac{1}{5}$=thinning rate of 80%). Conversely, as shown in FIG. 3B, the storage unit 107 sets the horizontal thinning rate to be lower as the size of the face detected by the face detection unit 105 decreases (e.g., thinning to $\frac{1}{2}$=thinning rate of 50%). This results in the number of columns of image signals within the focus measuring frame that are stored in the storage unit 107 being roughly constant. Accordingly, the storage unit 107 no longer needs to secure an amount of line memory corresponding to the size of the face in order to perform vertical contrast evaluation. Also, since the high contrast components of the eyebrows, eyes, lips and the like that is included in the face is adequately represented in the image signals after thinning, the biological characteristic of the face can be utilized effectively.

As mentioned above, according to the present embodiment, the vertical contrast components of the entire face can be acquired in vertical contrast evaluation, even when an amount of line memory corresponding to the size of the detected face is not secured. In FIGS. 3A and 3B, all the rows within the focus measuring frame thinned in the column direction are shown for ease of understanding, although, in practice, an amount of line memory equivalent to the tap length of the filter that is used in vertical evaluation need only be secured, and memory equivalent to one line is sequentially erased and accumulated after filtering.

Modification

Next, a case where the face detection unit 105 has an eye detection unit will be described as a modification of the present embodiment, with reference to FIG. 4.

Figure 4:
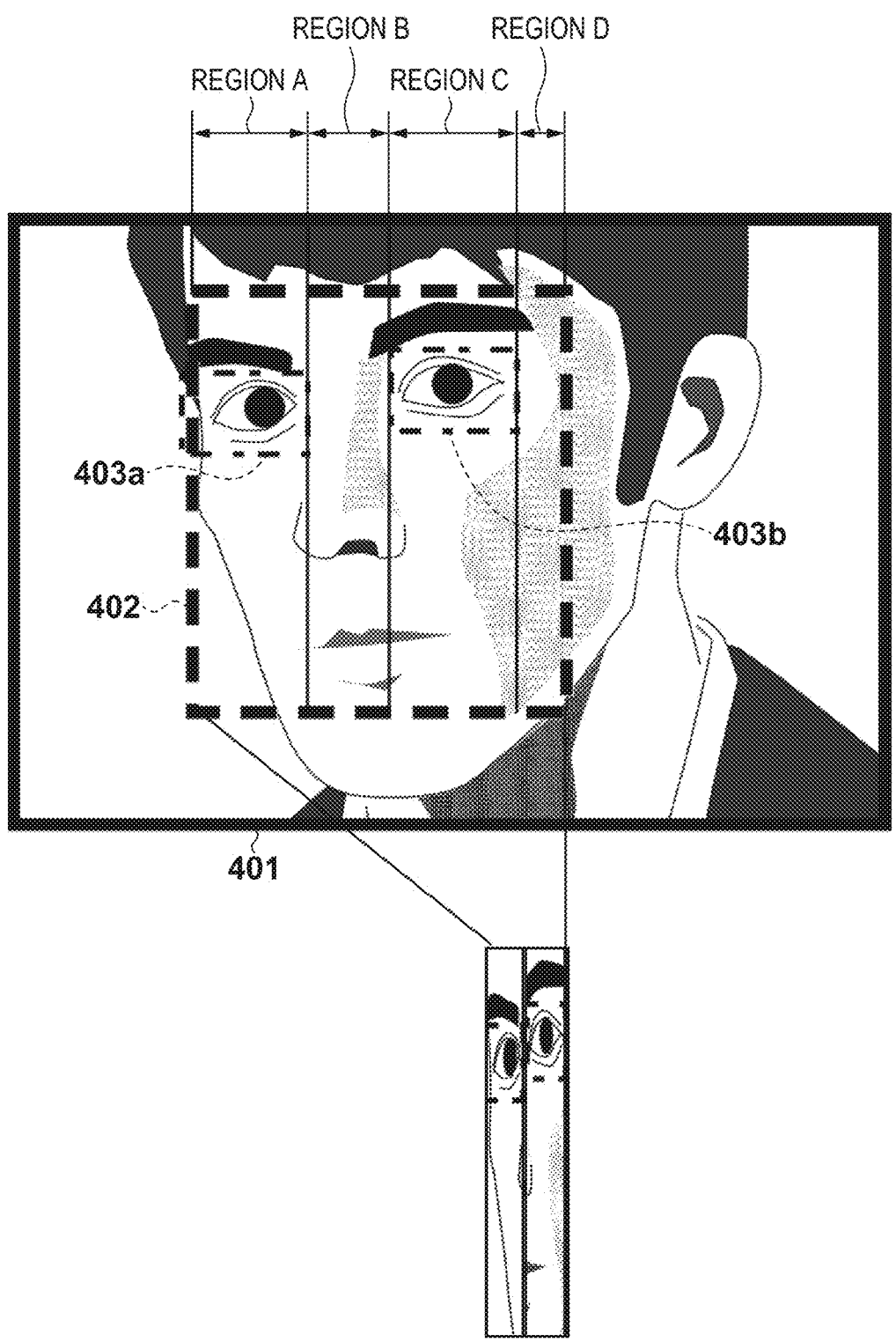
FIG. 4 is a diagram illustrating vertical contrast evaluation value calculation processing according to a modification of the first embodiment.

FIG. 4 illustrates a state in which a focus measuring frame 402 is set on the face region that is included in a shot image 401. Since the eyes and eyebrows exhibit the highest contrast of the elements making up the face, in the case where contrast evaluation is performed in the vertical direction (height direction of the face), it is desirable to exclude image signals that include the eyes and eyebrows from being subject to thinning.

In view of this, in the modification of the present embodiment, at the same time that the face detection unit 105 detects the face 402 as is shown in FIG. 4, the eye detection unit detects positions 403a and 403b of the eyes that are included in the face 402, and excludes the columns (regions A and C in the diagram) in which the eyes are included from being subject to thinning. As a result, as shown in FIG. 4, the thinning rate is lowered for columns that include the eyes (e.g., thinning to ⅓=thinning rate of 66%), and the thinning rate is raised for columns (regions B and D in the diagram) that do not include the eyes (e.g., thinning to 1/20=thinning rate of 95%). By thus adjusting the thinning rate between regions that include the eyes and regions that do not include the eyes, the amount of line memory required by the storage unit 107 need only be an amount corresponding to image signals thinned at a thinning rate (here, slightly less than 80%) that matches the size of the detected face.

As described above, according to the modification of the present embodiment, the vertical contrast components of the entire face can be acquired in vertical contrast evaluation, even when an amount of line memory corresponding to the size of the detected face is not secured.

Note that although, in the first embodiment, the region for contrast evaluation was given as the face region detected within an image capturing screen (in the case where a face is detected), specific regions of the object other than the face may be detected using image detection. For example, it is conceivable to clip and detect an object image from the background. Alternatively, a position within an image capturing screen may be input from an external input unit, or a position within the image capturing screen may be determined by detecting the line of sight of the photographer who is looking through a viewfinder.

Second Embodiment

Automatic focusing operations that are implemented by an image capturing apparatus 200 serving as a second embodiment according to the present invention will be described, with reference to FIGS. 5 to 7.

Figure 5:
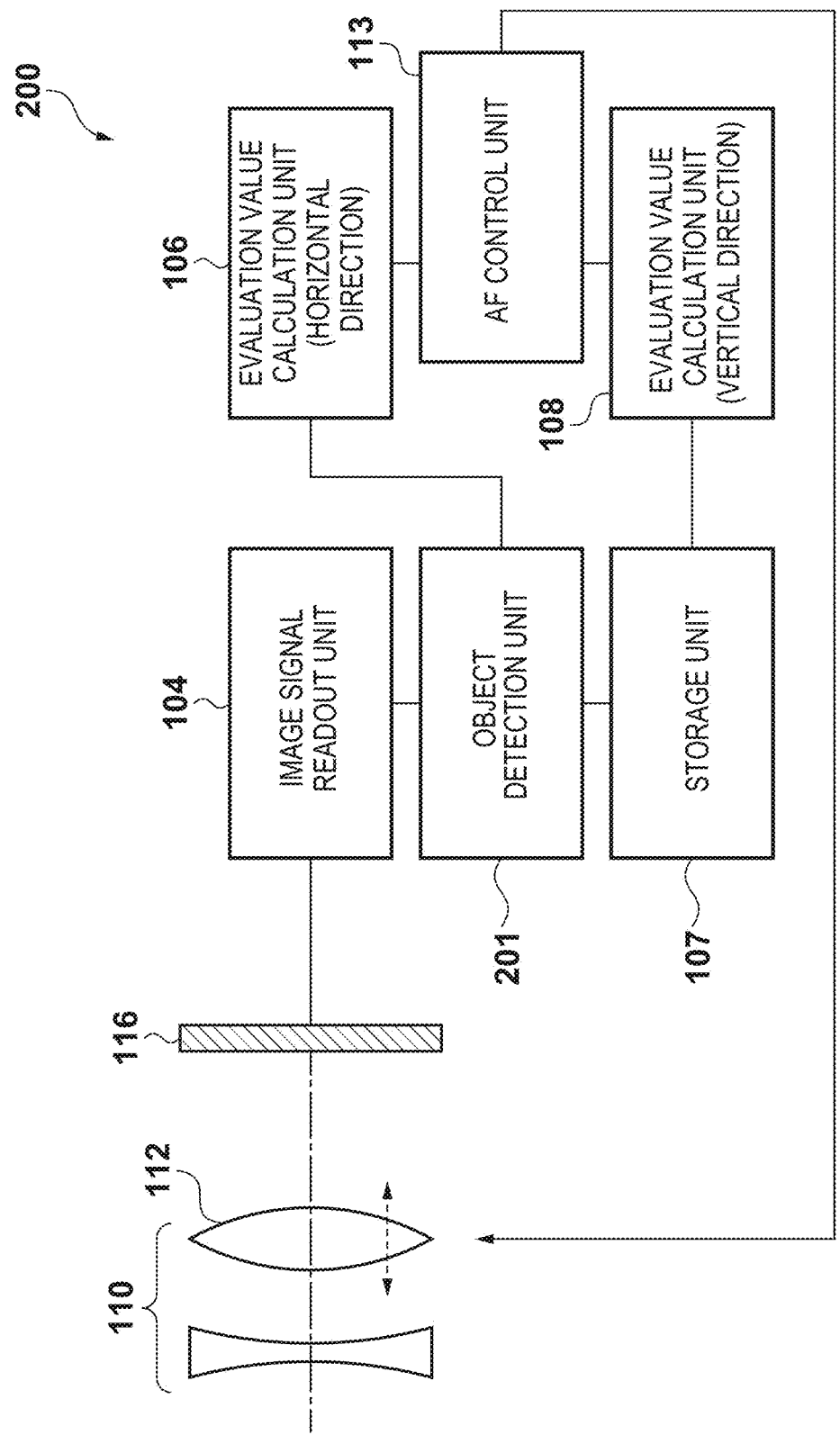
FIG. 5 is a block diagram showing an apparatus configuration according to the second embodiment.

FIG. 5 is a block diagram showing the configuration of the image capturing apparatus 200 of the second embodiment according to the present invention. A difference with the image capturing apparatus 100 is that an object detection unit 201 is provided instead of the face detection unit 105. The object detection unit 201 is not limited to detecting the face and can detect a main object that is included in image signals that are obtained from the image signal readout unit 104, based on luminance information or color information. Also, the image capturing apparatus 200 is provided with an evaluation value calculation unit 106 and an evaluation value calculation unit 108, and thus can acquire evaluation values in the horizontal and vertical directions, similarly to the image capturing apparatus 100. Generally various types of aberration exist in the image capturing optical system, one of which, astigmatism, results in a difference in the peaks of the horizontal evaluation value and the vertical evaluation value, and gives rise to the problem where the shot image is not visible in the focused state, even when focus adjustment is performed with one of the peak positions as the focused position. This occurs because the human eye observes an object in a state where both horizontal and vertical components are mixed together, and it has been conventionally proposed to solve this problem with techniques such as performing control with the mean position of both peak positions as the final focused position. The image capturing apparatus 200 is an image capturing apparatus capable of a focus adjustment operation that reduces the effects of such astigmatism.

Figure 6:
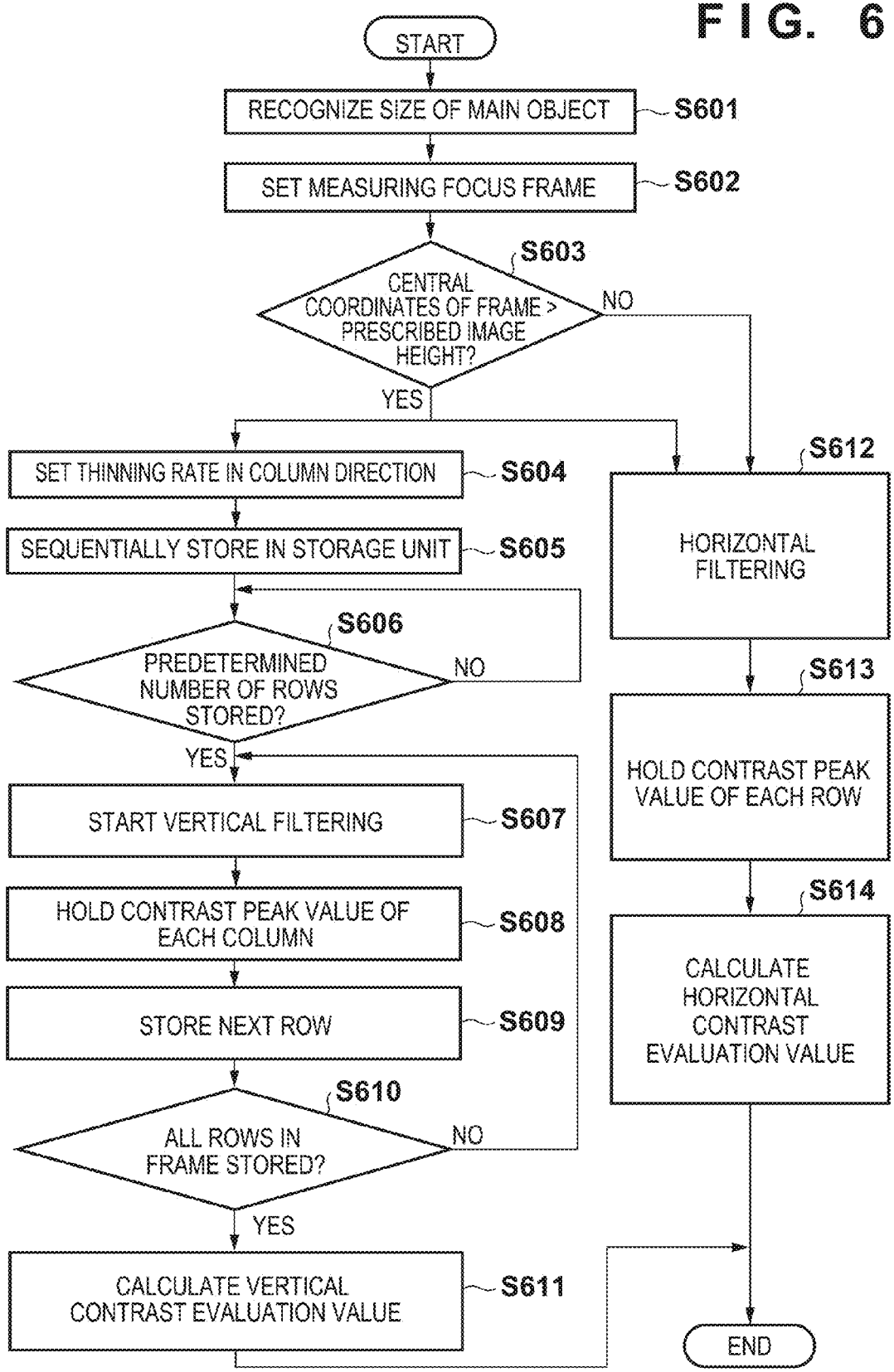
FIG. 6 is a flowchart showing contrast evaluation value calculation processing according to the second embodiment.

FIG. 6 is a flowchart showing processing up to and including the contrast evaluation value calculation that is performed after image signal readout by the image capturing apparatus 200 serving as the second embodiment according to the present invention. That is, this processing is part of one focus adjustment operation that is performed after the photographer has pressed a shutter release button (not shown) serving as an instruction unit for starting the focus adjustment operation and given an instruction to start the focus adjustment operation. This processing may also be part of the focus adjustment operation that is carried out automatically by the camera before the photographer shoots an image. At step S601, the object detection unit 201 detects a main object existing in the shooting range, and performs size recognition on the main object. This may involve recognizing the size of the main object by matching shapes within an image obtained from captured signals with preregistered objects, or recognizing the size of the main object automatically through processing such as edge extraction within the image. At step S602, the system control unit 122 sets the focus measuring frame in accordance with the size of the object recognized at step S601. At step S603, the system control unit 122 determines whether the central coordinates of the focus measuring frame set at step S602 are greater than or equal to a predetermined image height. If it is determined as a result of the determination that the central coordinates are greater than or equal to a predetermined image height, processing (S604 to S611 and S612 to S614) for calculating both the vertical evaluation value and the horizontal evaluation value is performed. On the other hand, if it is determined that the central coordinates are less than the predetermined image height, processing (S612 to S614) for calculating only the horizontal evaluation value is performed. This is because a deviation arises between the vertical evaluation value and the horizontal evaluation value due to the effects of aberration such as described above in the case where the predetermined image height is exceeded, and it is necessary to, for example, set the mean peak position thereof as the final focused position. The vertical contrast evaluation value calculation processing implemented from steps S604 to S611 is similar to the processing from steps S204 to S211 of the first embodiment shown in FIG. 2.

At step S612, the system control unit 122 performs filtering in the horizontal direction (=readout direction) on signals within the focus measuring frame set in step S602, out of the signal columns read out in one vertical synchronization period. Since sequential filtering of readout rows is possible at this time, it is not necessary to store the readout rows in line memory before performing filtering, unlike with vertical filtering. Generally, the signals that are read out in one vertical synchronization period during automatic focusing are thinned in the row direction, in order to realize a high frame rate. This thinning in the row direction is performed using a thinning rate determined in advance according to the frame rate. At step S613, the system control unit 122 holds the contrast peak value of each row from the filtering waveform obtained at step S612. Subsequently, at step S614, the system control unit 122 uses the evaluation value calculation unit 106 to add together the contrast peak values within the focus measuring frame that were held at step S613 for all the rows, and calculate a horizontal contrast evaluation value. This processing ends when the vertical and horizontal contrast evaluation values have been calculated.

Figure 7A:
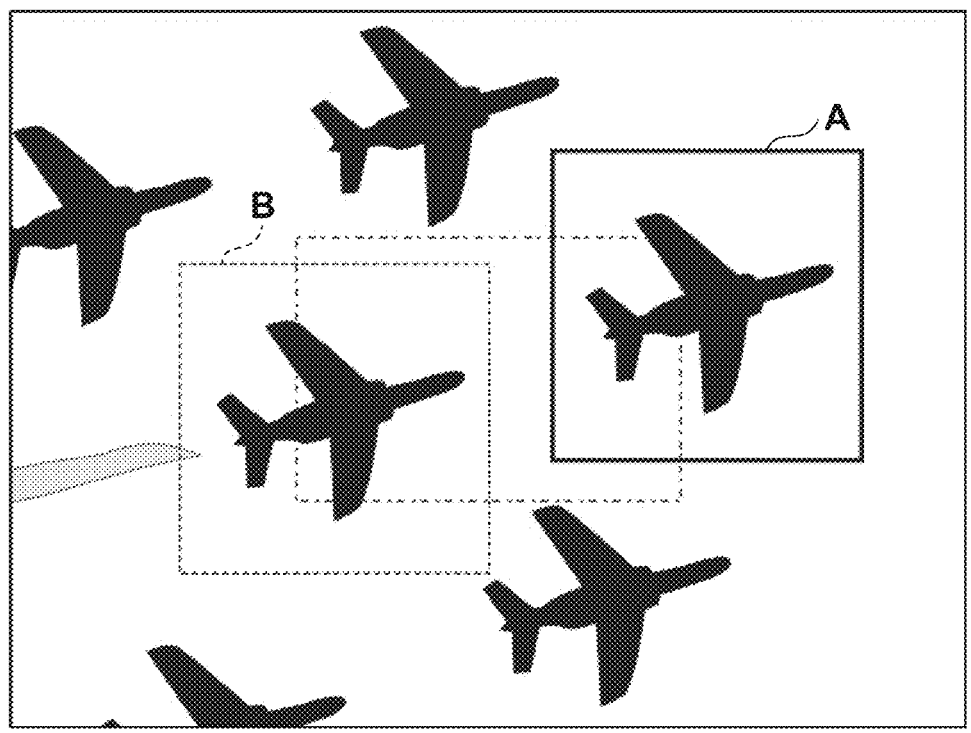
FIGS. 7A to 7C are diagrams illustrating contrast evaluation value calculation processing according to the second embodiment.
Figure 7B:
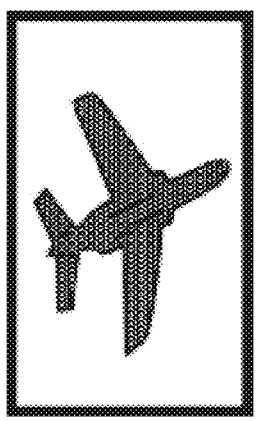
Figure 7C:
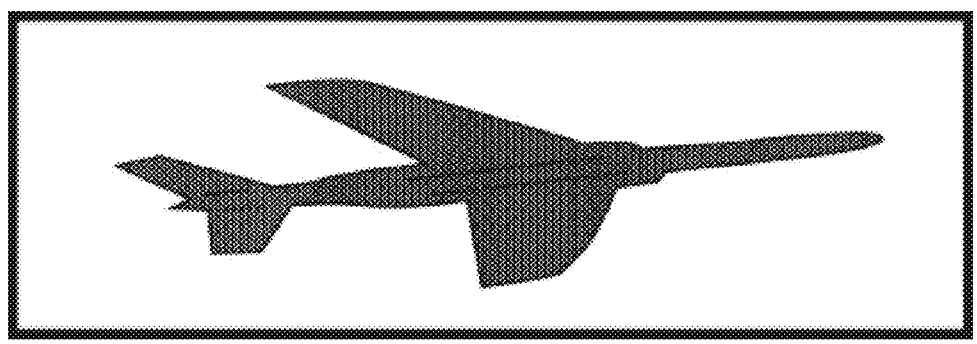

FIGS. 7A to 7C are schematic diagrams illustrating thinning that is performed when the image capturing apparatus 200 calculates the vertical and horizontal contrast evaluation values. FIG. 7A shows an image shot in live view when focus detection is performed. The frame shown with the solid line is a focus measuring and tracking frame that the image capturing apparatus 200 has determined to be the main object, and the frame shown with a dashed line is a tracking frame that the image capturing apparatus 200 has determined to be a sub-object. The actual focus adjustment operation is carried out with the focus measuring and tracking frame shown with the solid line. The dashed-dotted line in the middle of the screen is a boundary line for determining whether to calculate the vertical contrast evaluation value at the same time (step S603 in FIG. 6). Since the central coordinates of the focus measuring and tracking frame recognized as the main object and whose size and position have been set are located outside the dashed-dotted line, it is determined to calculate the vertical and horizontal contrast evaluation values. FIG. 7B is a schematic diagram showing a region that has been thinned in the column direction and stored in the line memory in order to calculate the vertical contrast evaluation value. Here, the thinning rate in the column direction is given as 80% (=thinning to ⅕). Since the thinning rate in the column direction is determined by the size of the object, similarly to the first embodiment, the amount of line memory does not need to be variable. Also, the thinning rate in the row direction is set to 66% (=thinning to ⅓) based on the frame rate of the sensor, and vertical evaluation is performed on the vertically long region, as shown in the diagram. FIG. 7C is a schematic diagram showing a region that has undergone thinning and filtering in the row direction, in order to calculate the horizontal contrast evaluation value. As mentioned above, since filtering can be performed directly at the time of calculating the horizontal contrast evaluation value, the rows that are read out need not be stored in the line memory, or the like.

Thus, even in the case where horizontal and vertical contrast evaluation values need to be calculated for an object that exceeds a predetermined image height, the amount of line memory used when performing vertical contrast evaluation, which requires line memory, does not need to be changed according to the object size. Vertical and horizontal contrast evaluation values are calculated for the regions in FIGS. 7B and 7C, and two peak positions are detected in a predetermined search range. The AF control unit 113 controls to drive the focus lens 112 with the mean position of these two peak positions as the final focused position.

In the present embodiment, whether or not vertical contrast evaluation is performed depends on the image height, but the present invention is not limited thereto, and both contrast evaluation values may be calculated for all image heights. Also, although it is not stated whether the image capturing apparatus 200 is an interchangeable lens-type image capturing apparatus, a configuration may be adopted in which the image capturing apparatus 200 is an interchangeable lens-type image capturing apparatus and switches between carrying out vertical contrast evaluation and not carrying out vertical contrast evaluation, depending on the type of lens that is attached. Also, although the AF control unit 113 takes the mean of two peak positions as the final focused position, the present invention is not limited thereto, and the AF control unit 113 may perform processing such as weighting one of the peak positions, and take the weighted peak position as the final focused position.

In both embodiments, only thinning at the time of contrast evaluation in which the column direction is the vertical direction was dealt with for ease of understanding, although, in practice, horizontal addition processing may be performed in order to increase the readout speed.

The readout direction of the image signal was given as the horizontal direction in the above embodiments, but may be in the vertical direction. In this case, it is the image signals in the vertical direction that undergo thinning at the time of being stored in the storage unit, and the vertical contrast evaluation value is calculated from the image signals stored in the storage unit.

Also, in the above embodiment, the evaluation value calculation unit 106 and the evaluation value calculation unit 108 determine to calculate contrast evaluation values as focusing signals. However, the present invention is not limited thereto as long as a focusing signal is obtained. For example, a conceivable method of calculating a focusing signal is to split the pupil region of the image capturing optical system and use an image sensor having pixels for focus detection that photoelectrically convert the object image obtained from the split pupil region. The output signal of a phase difference AF system that detects the phase difference of image signals using the output signals of the focus detection pixels and performs focus adjustment may be used as the focusing signal. Also, it is conceivable to use an image sensor having pixels that are constituted by one microlens and a plurality of photoelectric converters for splitting the exit pupil, for example. The output signal of a phase difference AF system that detects the phase difference of image signals using a plurality of pixel output signals obtained by photoelectrically converting light that has passed through different exit pupils and performs focus adjustment may also be used. Here, the output signal of a phase difference AF system refers to the phase difference and the defocus amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-273174, filed Dec. 27, 2013 and 2014-220627, filed Oct. 29, 2014, which are hereby incorporated by reference herein in their entirety.

What is claimed is:

1. An image capturing apparatus comprising:
an image sensor that has pixels arranged in a two-dimensional array, and is configured to receive object image light and perform a photoelectric conversion of the object image;
a detection unit configured to detect an object region based on first image signals that are sequentially read out from the image sensor in a horizontal direction or in a vertical direction;
a storage unit configured to sequentially store second image signals, wherein the second image signal is a portion of image signals that are generated by performing thinning processing on the image signals corresponding to the object region among the first image signals in a readout direction in which the first image signals are read out from the image sensor;
a first calculation unit configured to filter the second image signals sequentially in a different direction from the readout direction to calculate a first focusing signal; and
a focus adjustment unit configured to perform focus adjustment operation based on the first focusing signal,
wherein a thinning rate of the thinning processing when a size of the object region is a first size is greater than a thinning rate of the thinning processing when a size of the object region is a second size being smaller than the first size.

2. The apparatus according to claim 1, wherein the object region is a face region of a person.

3. The apparatus according to claim 1, wherein the thinning processing is processing for outputting image signals in order every predetermined number of rows, and thinning is uniformly performed on the object region.

4. The apparatus according to claim 1, wherein the first image signals are read out sequentially from the image sensor in the horizontal direction, and
the first calculation unit filters the second image signals in the vertical direction.

5. The apparatus according to claim 1, further comprising:
a second calculation unit configured to filter the first image signals sequentially in the readout direction to calculate a second focusing signal.

6. The apparatus according to claim 5, wherein, in a case where a height direction of the object region in the first image signals coincides with the direction in which the first image signals are read out from the image sensor, the focus adjustment unit performs focus adjustment operation based on the second focusing signal.

7. The apparatus according to claim 6, wherein in a case where the height direction of the object region in the first image signals does not coincide with the direction in which the first image signals are read out from the image sensor, the focus adjustment unit performs focus adjustment operation based on the first focusing signal and the second focusing signal.

8. The apparatus according to claim 1, further comprising:
an operation unit configured to accept an instruction from a photographer to start the focus adjustment operation,
wherein, in the focus adjustment operation that is performed when the instruction to start the focus adjustment operation is accepted by the operation unit, the thinning rate set according to the size of the object region is maintained at a constant rate until the focus adjustment operation is completed by the focus adjustment unit.

9. The apparatus according to claim 1, wherein the number of rows of the second image signals equivalent to the number of taps of a filter that is used by the first calculation unit.

10. The apparatus according to claim 1, wherein the thinning rate is changed according to a zoom magnification.

11. The apparatus according to claim 1, wherein, in a case where zooming results in the object region being a fourth size that is larger than a third size, the thinning rate of image signals in the readout direction is increased to be greater than when the object region is the third size.

12. The apparatus according to claim 2, further comprising:
an eye detection unit configured to detect an eye from the face region detected by the detection unit,
wherein the thinning rate in the readout direction of a region that includes an eye is reduced to be less than the thinning rate in the readout direction of a region that does not include an eye.

13. A control method of an image capturing apparatus having an image sensor that has pixels arranged in a two-dimensional array and is configured to receive object image light and perform a photoelectric conversion of the object image; the method comprising:
detecting an object region based on first image signals that are sequentially read out from the image sensor in a horizontal direction or in a vertical direction;
sequentially storing second image signals, wherein the second image signal is a portion of image signals that are generated by performing thinning processing on the image signals corresponding to the object region among the first image signals in a direction in which the first image signals are read out from the image sensor;
filtering the second image signals sequentially in a different direction from the readout direction and calculating a first focusing signal; and performing focus adjustment operation based on the first focusing signal, wherein a thinning rate of the thinning processing when a size of the object region is a first size is greater than a thinning rate of the thinning processing when a size of the object region is a second size being smaller than the first size.

14. A non-transitory computer-readable storage medium storing a program for causing a computer to function as a detection unit, a storage unit, a first calculation unit and a focus adjustment unit of a image capturing apparatus, the apparatus comprising an image sensor that has pixels arranged in a two-dimensional array, and is configured to receive object image light and perform a photoelectric conversion of the object image, wherein the detection unit detects an object region based on first image signals that are sequentially read out from the image sensor in a horizontal direction or in a vertical direction, the storage unit sequentially stores second image signals, wherein the second image signal is a portion of image signals that are generated by performing thinning processing on the image signals corresponding to the object region among the first image signals in a direction in which the first image signals are read out from the image sensor, the first calculation unit filters the second image signals sequentially in a different direction from the readout direction to calculate a first focusing signal, the focus adjustment unit configured to perform focus adjustment operation based on the first focusing signal, and wherein a thinning rate of the thinning processing when a size of the object region is a first size is greater than a thinning rate of the thinning processing when a size of the object region is a second size being smaller than the first size.

15. The apparatus according to claim 1, further comprising:

a second calculation unit configured to filter third image signals sequentially in the readout direction to calculate a second focusing signal, wherein the third image signals are generated by performing thinning processing at a thinning rate which is not based on the size of the object region, on image signals corresponding to the object region in the first image signals in a different direction from the direction of which the first image signals are read out from the image sensor.

16. The control method according to claim 13, wherein the object region is a face region of a person.

17. The control method according to claim 13, wherein the thinning processing is processing for outputting image signals in order every predetermined number of rows, and thinning is uniformly performed on the object region.

18. The control method according to claim 13, wherein the first image signals are read out sequentially from the image sensor in the horizontal direction, and the filtering step filters the second image signals in the vertical direction.

19. The control method according to claim 13, further comprising:

filtering the first image signals sequentially in the readout direction to calculate a second focusing signal.

20. The control method according to claim 19, wherein, in a case where a height direction of the object region in the first image signals coincides with the direction in which the first image signals are read out from the image sensor, the focus adjustment operation is performed based on the second focusing signal.

21. The control method according to claim 20, wherein in a case where the height direction of the object region in the first image signals does not coincide with the direction in which the first image signals are read out from the image sensor, the focus adjustment operation is performed based on the first focusing signal and the second focusing signal.

22. The control method according to claim 13, further comprising:

accepting an instruction from a photographer to start the focus adjustment operation, wherein, in the focus adjustment operation that is performed when the instruction to start the focus adjustment operation is accepted in the accepting step, the thinning rate set according to the size of the object region is maintained at a constant rate until the focus adjustment operation is completed.

23. The control method according to claim 13, wherein the number of rows of the second image signals equivalent to the number of taps of a filter that is used in the filtering step.

24. The control method according to claim 13, further comprising:

filtering third image signals sequentially in the readout direction to calculate a second focusing signal, wherein the third image signals are generated by performing thinning processing at a thinning rate which is not based on the size of the object region, on image signals corresponding to the object region in the first image signals in a different direction from the direction of which the first image signals are read out from the image sensor.

* * * * *